(12) United States Patent
Wang

(10) Patent No.: US 7,318,953 B2
(45) Date of Patent: Jan. 15, 2008

(54) BOARD MATERIAL

(76) Inventor: Wen-Tsan Wang, 6th Floor, No. 300, Jui Kuang Rd., Taipei (TW)

( * ) Notice: Subject to any disclaimer, the term of this patent is extended or adjusted under 35 U.S.C. 154(b) by 163 days.

(21) Appl. No.: 11/332,337

(22) Filed: Jan. 17, 2006

(65) Prior Publication Data

US 2007/0166502 A1    Jul. 19, 2007

(51) Int. Cl.
*B32B 3/22* (2006.01)
(52) U.S. Cl. .......................................................... 428/54
(58) Field of Classification Search ................... 428/54, 428/55, 56; 160/236, 133, 130
See application file for complete search history.

(56) References Cited

FOREIGN PATENT DOCUMENTS

EP            1447337 A1 *   8/2004

\* cited by examiner

*Primary Examiner*—Alexander S. Thomas
(74) *Attorney, Agent, or Firm*—Leong C. Lei

(57) ABSTRACT

A board material A board material having a flexible sheet member, and a plurality of hard strip members including a plurality of first hard strip members bonded in parallel to a first side of the flexible sheet member and second hard strip members arranged into sets and bonded in parallel to a second side of the flexible sheet members corresponding to the first hard strip members, the first hard strip members having a width in an integral multiple of the width of the second hard strip members.

3 Claims, 5 Drawing Sheets

BOARD MATERIAL

BACKGROUND OF THE INVENTION (a) Technical Field of the Invention

The present invention relates to board materials for making storage boxes baskets as well as screens and more particularly, to such a board material, which has flexible and hard characteristics.

(b) Description of the Prior Art

Various materials including ceramics, glass, wood, plastics, stainless steel, and etc. can be used for making storage containers. Storage containers of wooden material cause an antique sense of beauty and are intensively invited by consumers for storing jewelry and personal small items.

The aforesaid materials such as ceramics, glass, wood, plastics, and stainless steel are hard materials. Storage containers made of these materials have a stiff structure. There are storage containers using hard members to support flexible fabric container body in shape.

U.S. Pat. No. 6,419,103, equivalent to German Utility No. 20106397.2, discloses a bamboo basket, which includes a bottom frame, a top open frame, a plurality of flexible peripheral side panels respectively connected between the bottom frame and the top open frame and abutted against one another at an angle and defining with the bottom frame and the top open frame a holding space for holding things. The peripheral side panels each have a plurality of longitudinal bamboo slats and a plurality of transverse bamboo slats intersected with the longitudinal bamboo slats, a plurality of upright angle bars respectively connected between the bottom frame and the top open frame and attached to the abutted area between each two of the peripheral side panels at an outer side, and a plurality of packing strips respectively adhered to the peripheral side panels over the abutted area between each two of the peripheral side panels at an inner side opposite to the upright angle bars and a bottom side of each of the peripheral side panels. This structure of bamboo basket has a complicated structure, resulting in a high manufacturing cost.

U.S. Pat. No. 6,419,103, equivalent to German Utility No. 03000275.2, discloses a bendable board material, which has a flexible base sheet, and two sets of hard slats respectively symmetrically fastened to two opposite sides of the flexible base sheet and arranged in parallel. According to this design, the hard slats are equal in size and symmetrically fastened to the two opposite sides of the flexible base sheet. This design has an application limitation.

SUMMARY OF THE INVENTION

The primary purpose of the present invention is to provide a twister belt that eliminates the aforesaid problems. According to a first embodiment of the present invention, the board material comprises a flexible sheet member and a plurality of hard strip members. The hard strip members includes a plurality of first hard strip members bonded in parallel to the first surface of the flexible sheet member, and a plurality of second hard strip members arranged into sets and bonded in parallel to the second surface of the flexible sheet member corresponding to the first hard strip members. Further, the first hard strip members have a width in an integral multiple of the width of the second hard strip members.

According to a second embodiment of the present invention, the board material comprises a plurality of flexible sheet members arranged in parallel and spaced from one another at a pitch, and a plurality of hard strip members bonded to the flexible sheet members at two sides. The hard strip members include a plurality of long hard strip members and short hard strip members. The long hard strip members are symmetrically bonded in parallel to the two opposite sides of the flexible sheet members. The short hard strip members are arranged in set and symmetrically bonded to the two opposite sides of the flexible sheet members and aligned in line between each two adjacent long hard strip members. The long hard strip members have a length equal to the combined widths of the flexible sheet member plus the gap between each two adjacent flexible sheet members. The short hard strip members each have a width equal to the width of one flexible sheet member.

According to a third embodiment of the present invention, the board material comprises a plurality of flexible cord members arranged in parallel and spaced from one another at a pitch, and a plurality of hard strip members. The hard strip members include long hard strip members and short hard strip members. The long hard strip members are arranged in pairs and symmetrically bonded to the flexible cord members at two opposite sides in a parallel manner. The short hard strip members are bonded to the flexible cord members at two opposite sides between each pair of long hard strip members. The long hard strip members have a length equal to the combined widths of the flexible sheet member plus the gap between each two adjacent flexible sheet members. The short hard strip members each have a width equal to the width of one flexible sheet member.

In any of the aforesaid three embodiments, the hard strip members can be made having a trapezoidal or circularly arched cross section.

The foregoing object and summary provide only a brief introduction to the present invention. To filly appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
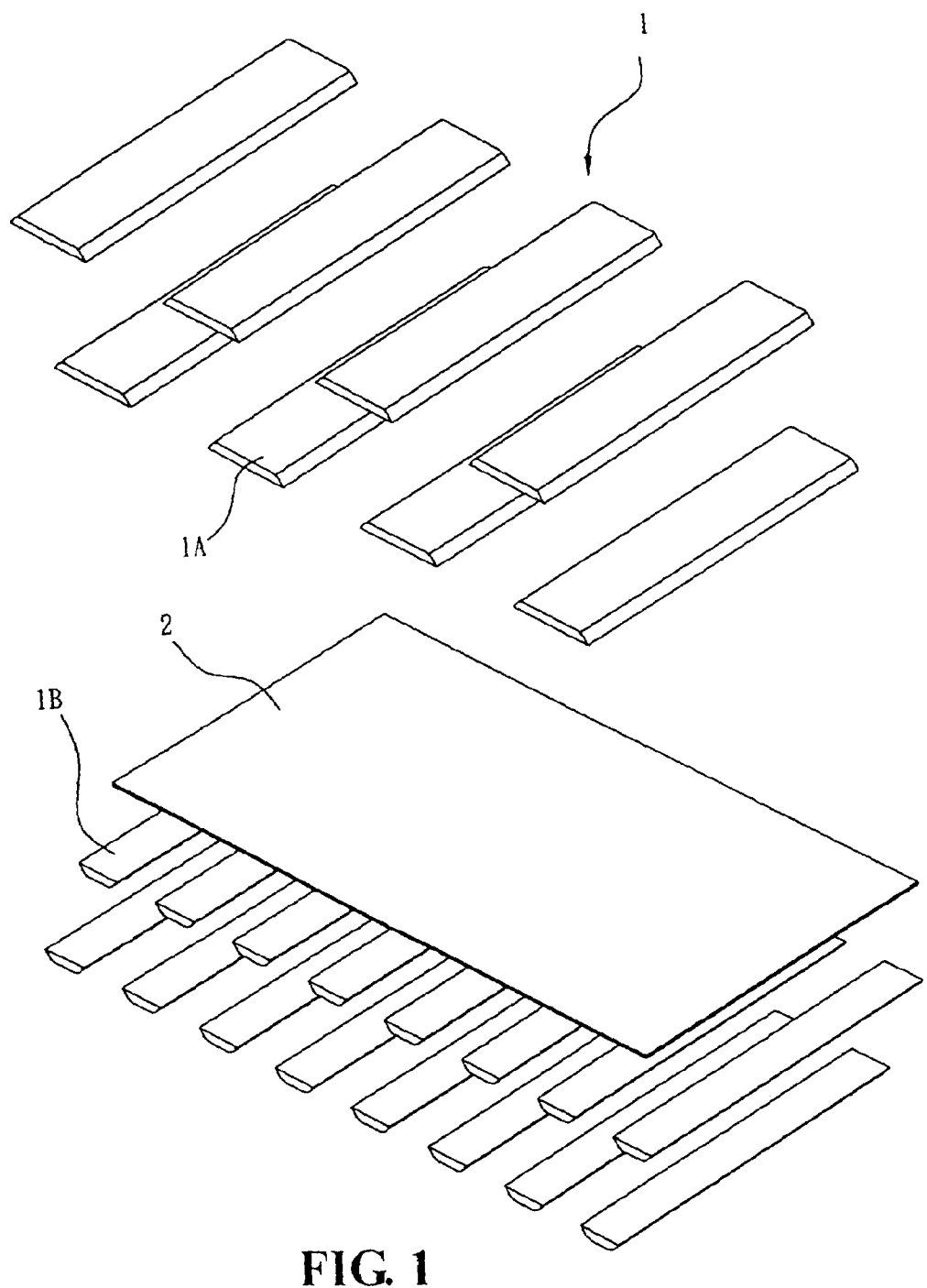
FIG. 1 is an exploded view of a board material in accordance with a first embodiment of the present invention.
Figure 2:
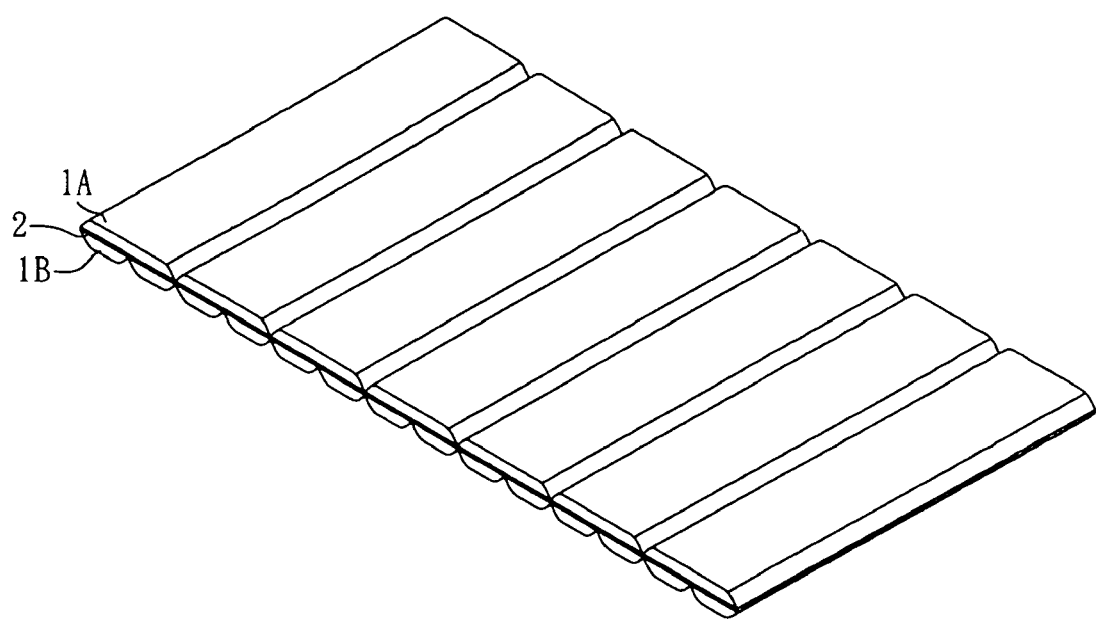
FIG. 2 is an elevational assembly view of the board material in accordance with the first embodiment of the present invention.

Referring to FIGS. 1 and 2, a board material in accordance with a first embodiment of the present invention is shown comprising a rectangular flexible sheet member 2, and a plurality of hard strip members 1, The hard strip members 1 include first hard strip members 1A and second hard strip members 1B. The width of the first hard strip members 1A is an integral multiple (two times, three times, or the like) of the width of the second hard strip members 1B. The rectangular flexible sheet member 2 is a soft, tough, strong fabric sheet member. Preferably, the hard strip members 1 are made of wood that gives an image of a high quality. Further, the hard strip members 1 can be made in any of a variety of shapes. According to this embodiment, the hard strip members 1 have a trapezoidal cross section, i.e., the two opposite short sides (distal ends) of each hard strip member 1 are bevelled. Alternatively, the hard strip members 1 can be made having a circularly arched cross section.

The first hard strip members 1A and the second hard strip members 1B have the respective back side covered with a glue and then the first hard strip members 1A and the second hard strip members 1B are respectively and symmetrically adhered to the top and bottom surfaces of the rectangular flexible sheet member 2, thereby forming the designed board material as shown in FIG. 2. By means of the flexible characteristic of the rectangular flexible sheet member 2, the user can bend the board material along the gap between each two adjacent first hard strip members 1A.

Figure 3:
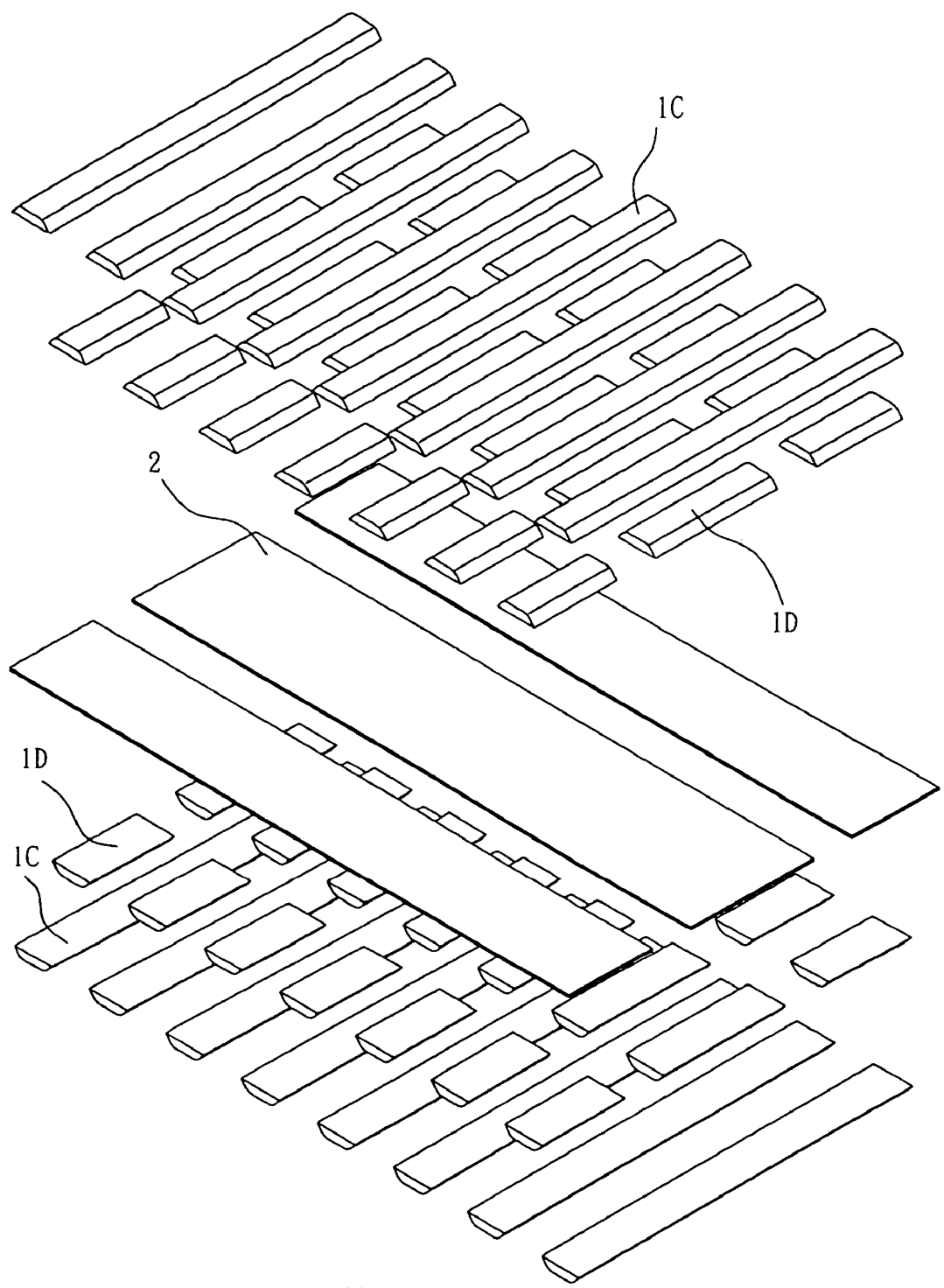
FIG. 3 is an exploded view of a board material in accordance with a second embodiment of the present invention.
Figure 4:
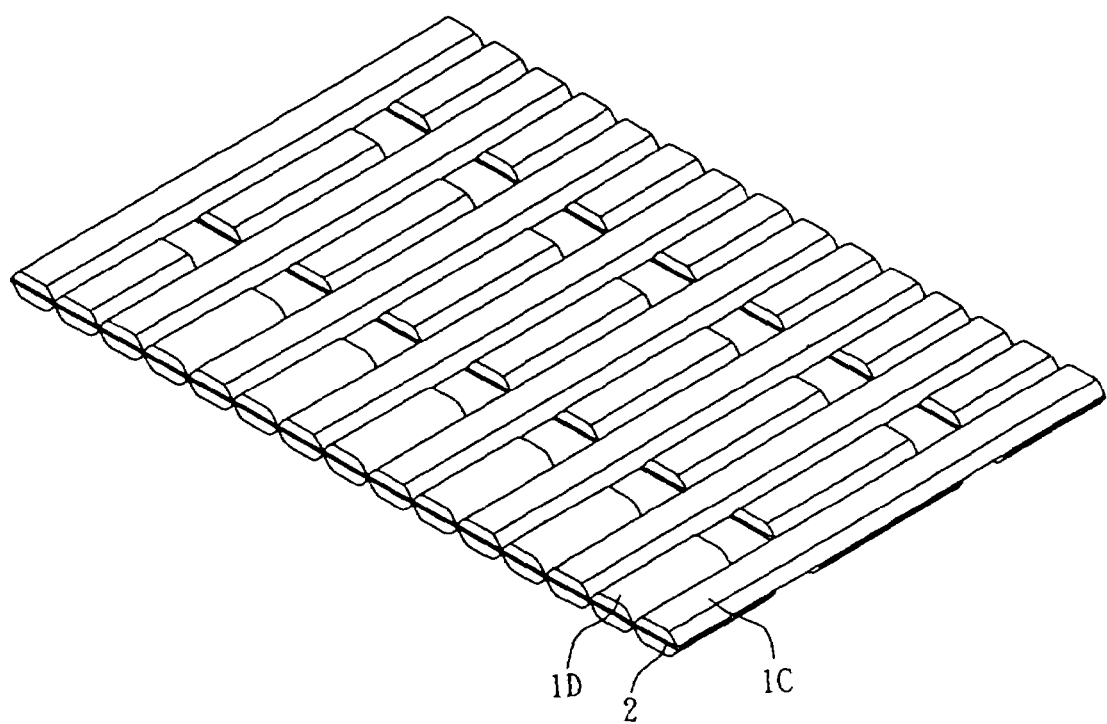
FIG. 4 is an elevational assembly view of the board material in accordance with the second embodiment of the present invention.

FIGS. 3 and 4 show a board material in accordance a second embodiment of the present invention. According to this embodiment, the board material is comprised of a plurality of rectangular flexible sheet members 2 and a plurality of hard strip members. The rectangular flexible sheet members 2 are arranged in parallel and spaced from one another at a pitch. Further, the rectangular flexible sheet members 2 are equal in length but different in width. The hard strip members include long hard strip members 1C and short hard strip members 1D. The long hard strip members 1C have a length equal to the combined width of the rectangular flexible sheet members 2 plus the gap between each two adjacent rectangular flexible sheet members 2. The short hard strip member 1D have different lengths corresponding to the widths of rectangular flexible sheet members 2. The long hard strip members 1C are symmetrically transversely bonded to the top and bottom walls of the rectangular flexible sheet members 2. The short-hard strip members 1D are respectively transversely bonded to the top and bottom walls of the rectangular flexible sheet members 2 and respectively aligned in line between each two adjacent long hard strip members 1C.

Figure 5:
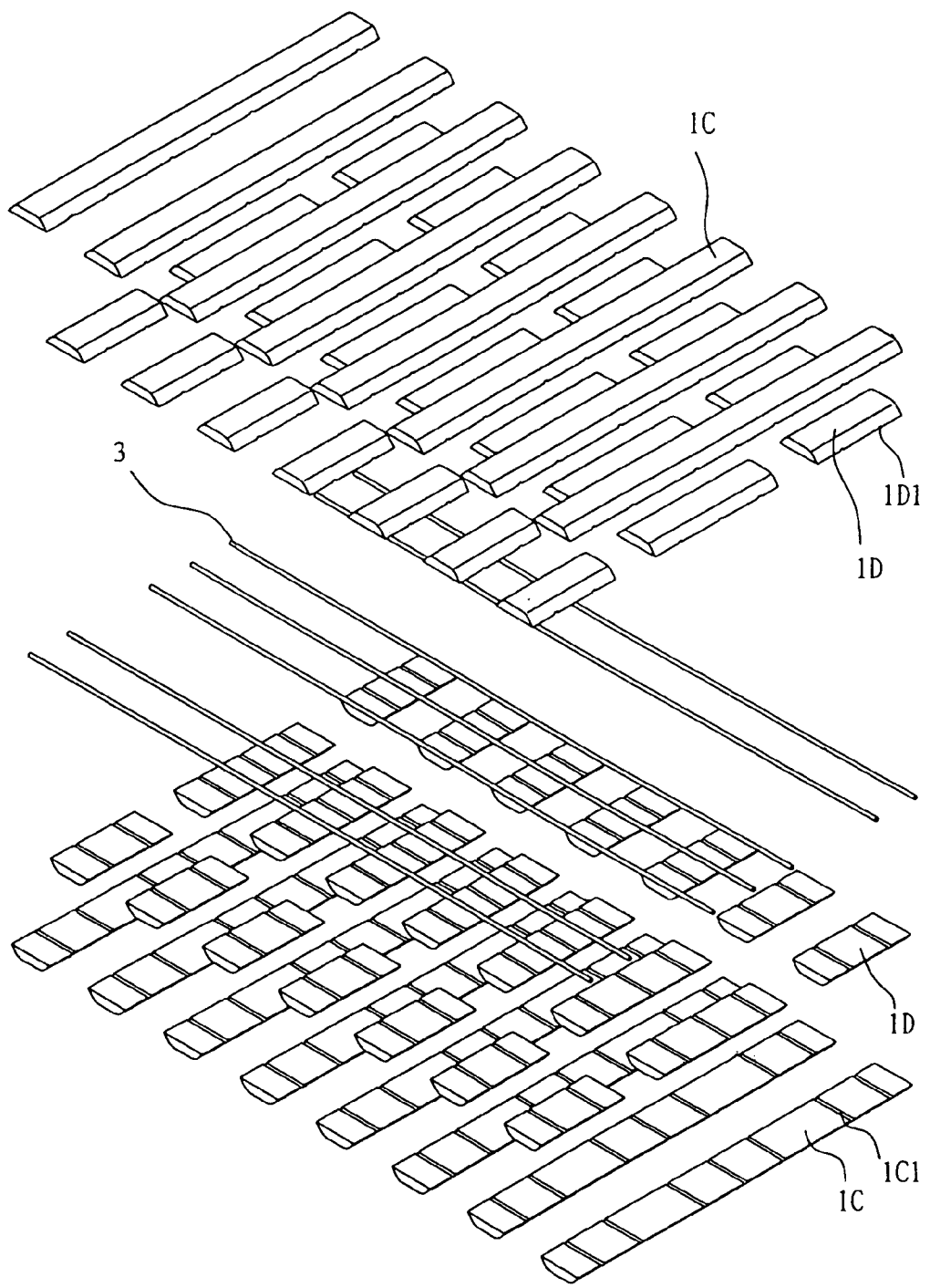
FIG. 5 is an exploded view of a board material in accordance with a third embodiment of the present invention.

FIG. 5 shows a board material in accordance with a third embodiment of the present invention. This embodiment is similar to the aforesaid second embodiment with the exception of the use of flexible cord members 3 to substitute for the aforesaid rectangular flexible sheet members 2. Further, the hard strip members 1C and 1D each have a plurality of transversely extending positioning grooves 1C or 1D for receiving the flexible cord members 3 on the bottom wall thereof so that the hard strip members 1C and 1D at one side of the flexible cord members 3 can be directly positively bonded to the hard strip members 1C and 1D at the opposite side of the flexible cord members 3.

By means of the rectangular flexible sheet members 2 or the flexible cord members 3, a board material in accordance with the present invention can be rolled into a roll and mounted with an end cap or the like to form a cylindrical container. A number of board materials can be fastened with frames to form a rectangular storage box. Further, a board material in accordance with the present invention can be used to make a screen for partition.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A board material comprising:
    a plurality of flexible sheet members arranged in parallel and spaced from one another at a pitch, said flexible sheet members each having a first surface and a second surface opposite to said first surface; and
    a plurality of hard strip members, said hard strip members each having two bevelled end edges, said hard strip members including a plurality of long hard strip members and short hard strip members, said long hard strip members being symmetrically bonded in parallel to the first and second surfaces of said flexible sheet members, said short hard strip members being arranged in sets and symmetrically bonded to the first and second surfaces of said flexible sheet members and aligned in line between each two adjacent long hard strip members, said long hard strip members having a length equal to the combined widths of said flexible sheet member plus the gap between each two adjacent flexible sheet members, said short hard strip members each having a width equal to the width of one of said flexible sheet members.

2. The board material as claimed in claim 1, wherein said hard strip members each have a trapezoidal cross section.

3. The board material as claimed in claim 1, wherein said hard strip members each have a circularly arched cross section.

* * * * *